US009732783B2

(12) United States Patent
Lee et al.

(10) Patent No.: US 9,732,783 B2
(45) Date of Patent: Aug. 15, 2017

(54) ANTI-LOOSENING BOLT ASSEMBLY

(71) Applicants: SAMSON CO., LTD., Chungcheongbuk-do (KR); KOREA INSTITUTE OF MACHINERY & MATERIALS, Daejeon (KR)

(72) Inventors: MooGyum Lee, Chungcheongbuk-do (KR); DongWoo Kim, Gyeongsangbuk-do (KR)

(73) Assignees: FINDMOLD CO., LTD., Cheongju-si, Chungcheongbuk-do (KR); KOREA INSTITUTE OF MACHINERY & MATERIALS, Daejeon (KR)

( * ) Notice: Subject to any disclaimer, the term of this patent is extended or adjusted under 35 U.S.C. 154(b) by 56 days.

(21) Appl. No.: 14/962,280

(22) Filed: Dec. 8, 2015

(65) Prior Publication Data

US 2016/0160904 A1 Jun. 9, 2016

(30) Foreign Application Priority Data

Dec. 9, 2014 (KR) ........................ 10-2014-0175640

(51) Int. Cl.
*F16B 39/24* (2006.01)
*F16B 39/282* (2006.01)
(Continued)

(52) U.S. Cl.
CPC ............ *F16B 39/24* (2013.01); *F16B 39/282* (2013.01); *F16B 5/0241* (2013.01); *F16B 41/002* (2013.01); *F16B 2001/0035* (2013.01)

(58) Field of Classification Search
CPC . F16B 39/24; F16B 39/282; F16B 2001/0035
(Continued)

(56) References Cited

U.S. PATENT DOCUMENTS 5,895,189 A * 4/1999 Ruckert ................ F16B 5/0233
403/DIG. 1
5,967,722 A * 10/1999 Fett ........................ F16B 39/10
411/120

(Continued)

FOREIGN PATENT DOCUMENTS

JP 51-50153 4/1976
KR 10-1999-0019896 A 3/1999
(Continued)

*Primary Examiner* — Gary Estremsky
(74) *Attorney, Agent, or Firm* — Rabin & Berdo, P.C.

(57) ABSTRACT

An anti-loosening bolt assembly includes a bolt having a bolt head and a bolt shank; a fixed nut having second threads on an inner circumferential surface thereof; and a washer, wherein the bolt head includes a plurality of locking protrusions, each of the locking protrusions having an inclined locking surface and a vertical locking surface, the washer includes a plurality of stop protrusions, each of the stop protrusions having an inclined stop surface and a vertical stop surface, and a magnetic member is provided in the washer such that the magnetic member maintains a combined state of the washer with an objective member using a magnetic force, so that when a rotational force is applied to the bolt in the loosening direction, the inclined locking surface is stopped by the inclined stop surface, thereby preventing the bolt from loosening and rotating.

8 Claims, 8 Drawing Sheets

(51) Int. Cl.
  *F16B 5/02* (2006.01)
  *F16B 41/00* (2006.01)
  *F16B 1/00* (2006.01)
(58) Field of Classification Search
  USPC ........................................................ 411/149
  See application file for complete search history.

(56) References Cited

U.S. PATENT DOCUMENTS

| | | | | |
|---|---|---|---|---|
| 6,546,689 | B1* | 4/2003 | Kim .......................... | E04B 1/48 |
| | | | | 403/338 |
| 7,168,902 | B2* | 1/2007 | Terry ....................... | F16B 31/04 |
| | | | | 411/149 |
| 7,261,506 | B2* | 8/2007 | Smolarek ............... | F16B 39/282 |
| | | | | 411/114 |
| 7,462,043 | B2* | 12/2008 | Deisenhofer .......... | H01R 4/646 |
| | | | | 411/149 |
| 7,955,037 | B2* | 6/2011 | Disantis ................ | F16B 35/041 |
| | | | | 411/149 |
| 2007/0196195 | A1 | 8/2007 | Lin | |
| 2010/0263173 | A1* | 10/2010 | Clarke .................... | A41F 1/002 |
| | | | | 24/303 |

FOREIGN PATENT DOCUMENTS

KR  10-2012-0044113 A  5/2012
KR  10-2014-0046298 A  4/2014

* cited by examiner

ANTI-LOOSENING BOLT ASSEMBLY

BACKGROUND OF THE INVENTION

Field of the Invention

The present invention generally relates to an anti-loosening bolt assembly. More particularly, the present invention relates to an anti-loosening bolt assembly that can provide improved anti-loosening performance for a long period.

Description of the Related Art

Generally, the engagement of a bolt with a nut to function as a fastener is maintained by engagement between threads of the bolt and the nut, and has been widely used in various fields for a long time. However, since the engagement of the bolt with the nut is maintained by frictional forces acting between female threads and male threads thereof, they are inefficient in that the engagement of the bolt with the nut is easily loosened due to exterior shocks and vibrations.

Accordingly, a variety of structures are being studied to prevent the engagement of the bolt with the nut from deteriorating after the engagement thereof is completed. For example, as disclosed in Korean Patent Application Publication No. 10-1999-0019896, the structure of an anti-loosening bolt in which the engagement of the bolt with the slotted nut can be prevented from being loosened is presented. The anti-loosening bolt includes the slotted nut radially having a plurality of fixing slots, and a bolt having a plurality of fixing feet protruding from an end of the bolt, the fixing feet seated in the fixing slots of the slotted nut. In this structure of the anti-loosening bolt, it is difficult to work on the fixing feet provided by extending from the end of a bolt shank, and after the engagement of the bolt with the nut is completed, it is required to bend the fixing feet, thereby increasing man hours and delaying completion of work.

Though various kinds of anti-loosening bolts other than the anti-loosening bolt mentioned above have been presented, the structure of the anti-loosening bolts is complex and thus it is inefficient to use such anti-loosening bolts. Further, the anti-loosening effect of such bolts deteriorates as time lapses.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Patent Application Publication No. 10-1999-0019896

SUMMARY OF THE INVENTION

Accordingly, the present invention has been made keeping in mind the above problems occurring in the related art, and the present invention is intended to propose an anti-loosening bolt assembly configured in such a manner that a bolt is prevented from rotating by inclined surfaces formed on a lower surface of a bolt head and on an upper surface of a washer, and a combined state of the washer with an objective member to be fastened by the bolt is maintained by a magnetic member provided in the washer, and thus the washer is prevented from rotating, which prevents the bolt from loosening.

The present invention is also intended to propose the anti-loosening bolt assembly configured in such a manner that before the objective member is fastened by the bolt, a magnetic member is spaced from the lower surface of a washer, and when the bolt and a nut are engaged with each other, the vertical locking surface of the bolt presses down the magnetic member, and the magnetic member comes into close contact with the objective member, and thus the bolt and the washer, and the washer and the objective member have better engagement with each other.

Objects mentioned above and several advantages of the present invention will be more apparent from embodiments of the present invention with reference to the accompanying drawings by those skilled in the art.

In order to achieve the above objects, according to one aspect of the present invention, there is provided an anti-loosening bolt assembly including: a bolt having a bolt head and a bolt shank, wherein the bolt shank vertically extends from a lower surface of the bolt head, the bolt shank having first threads formed on an outer circumferential surface thereof; a fixed nut having second threads on an inner circumferential surface thereof, the second threads being engaged with the first threads of the bolt; and a washer arranged between the bolt and the objective member to be fastened by the bolt, wherein the bolt head includes a plurality of locking protrusions provided on the lower surface thereof in a circumferential direction of the bolt head, each of the locking protrusions having an inclined locking surface and a vertical locking surface, wherein the inclined locking surface is provided by having an inclination on the lower surface of the bolt head, and the vertical locking surface connects the inclined locking surface with a neighboring inclined locking surface, and an upper end part of the inclined locking surface is directed to a loosening direction of the bolt, and a lower end part of the inclined locking surface is directed to a tightening direction of the bolt, the washer includes a plurality of stop protrusions provided on an upper surface thereof in a circumferential direction of the washer, each of the stop protrusions having an inclined stop surface and a vertical stop surface, wherein the inclined stop surface is provided by having an inclination on the upper surface of the washer, and the vertical stop surface connects the inclined stop surface with a neighboring inclined stop surface, and an upper end part of the inclined stop surface is directed to a loosening direction of the bolt, and a lower end part of the inclined stop surface is directed to a tightening direction of the bolt, and a magnetic member is provided in the washer such that the magnetic member maintains a combined state of the washer with the objective member using a magnetic force, so that when a rotational force is applied to the bolt in the loosening direction, the inclined locking surface of the bolt is stopped by the inclined stop surface of the washer, thereby preventing the bolt from loosening and rotating.

According to the first embodiment of the present invention, the washer may include a ring-shaped insert groove on a lower surface thereof, and a through hole on an upper surface thereof, and the magnetic member may have a thickness less than a thickness of the insert groove.

According to the first embodiment of the present invention, when the bolt is fastened to the fixed nut, a lower end part of the locking protrusion may press the magnetic member exposed outside an upper end of the through hole such that the magnetic member is located in a lower part of the insert groove.

According to the first embodiment of the present invention, the magnetic member may include a protrusion protruding outward from an outer circumferential surface thereof in a radial direction, and the insert groove may include a protrusion insert groove such that the magnetic member is held in the washer by an insertion of the protrusion into the protrusion insert groove.

Meanwhile, in order to achieve the above object, according to one aspect of the second embodiment of the present invention, there is provided an anti-loosening bolt assembly including: a fixed bolt having a fixed bolt shank, the fixed bolt shank having first threads formed on an outer circumferential surface thereof; a nut including second threads on an inner circumferential surface thereof, the second threads of the nut being engaged with the first threads of the fixed bolt shank; and a washer arranged between the nut and the objective member to be fastened by the nut, wherein the nut includes a plurality of locking protrusions provided in a circumferential direction thereof, each of the locking protrusions having an inclined locking surface and a vertical locking surface, wherein the inclined locking surface is provided by having an inclination on the lower surface of the nut, and the vertical locking surface connects the inclined locking surface with a neighboring inclined locking surface, and an upper end part of the inclined locking surface is directed to a loosening direction of the nut, and a lower end part of the inclined locking surface is directed to a tightening direction of the nut, the washer includes a plurality of stop protrusions provided on an upper surface thereof in a circumferential direction of the washer, each of the stop protrusions having an inclined stop surface and a vertical stop surface, wherein the inclined stop surface is provided by having an inclination on the upper surface of the washer, and the vertical stop surface connects the inclined stop surface with a neighboring inclined stop surface, and an upper end part of the inclined stop surface is directed to a loosening direction of the nut, and a lower end part of the inclined stop surface is directed to a tightening direction of the nut, a magnetic member is provided in the washer such that the magnetic member maintains a combined state of the washer with the objective member using a magnetic force, so that when a rotational force is applied to the nut in the loosening direction, the inclined locking surface of the nut is prevented from rotating by an engagement of the inclined locking surface of the nut with the inclined stop surface of the washer.

According to the second embodiment of the present invention, the washer may include a ring-shaped insert groove on a lower surface thereof, and include a through hole on an upper surface thereof, and the magnetic member has a thickness less than a thickness of the insert groove.

According to the second embodiment of the present invention, when the nut is engaged with the fixed bolt, a lower end part of the locking protrusion may press the magnetic member exposed outside an upper end of the through hole such that the magnetic member is located in a lower part of the insert groove.

According to the second embodiment of the present invention, the magnetic member may include a protrusion protruding outward from an outer circumferential surface thereof to an outside in a radial direction, and the insert groove may include a protrusion insert groove such that the magnetic member is held in the washer by an insertion of the protrusion into the protrusion insert groove.

The anti-loosening bolt assembly of the present invention is configured in such a manner that a bolt is prevented from rotating by inclined surfaces formed on a lower surface of a bolt head and on an upper surface of a washer, and the washer and the objective member to be fastened are combined by a magnetic member provided in the washer, and thus the washer is prevented from rotating. Accordingly, the anti-loosening bolt assembly of the present invention prevents the bolt from loosening.

In addition, the anti-loosening bolt assembly of the present invention is configured in such a manner that before a bolt is engaged with the objective member to be fastened, a magnetic member is spaced from the lower surface of a washer, and when the bolt and a nut are engaged with each other, the vertical locking surface of the bolt presses down the magnetic member, and the magnetic member comes into close contact with the objective member, and thus the bolt and the washer, and the washer and the objective member to be fastened have better engagement with each other.

Accordingly, before the washer, into which the magnetic member is inserted, is engaged with the objective member to be fastened, the magnetic member is not located in the lower part of the washer body, but in the upper part of the washer, and thus the washer can be easily separated from neighboring bolts and nuts.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
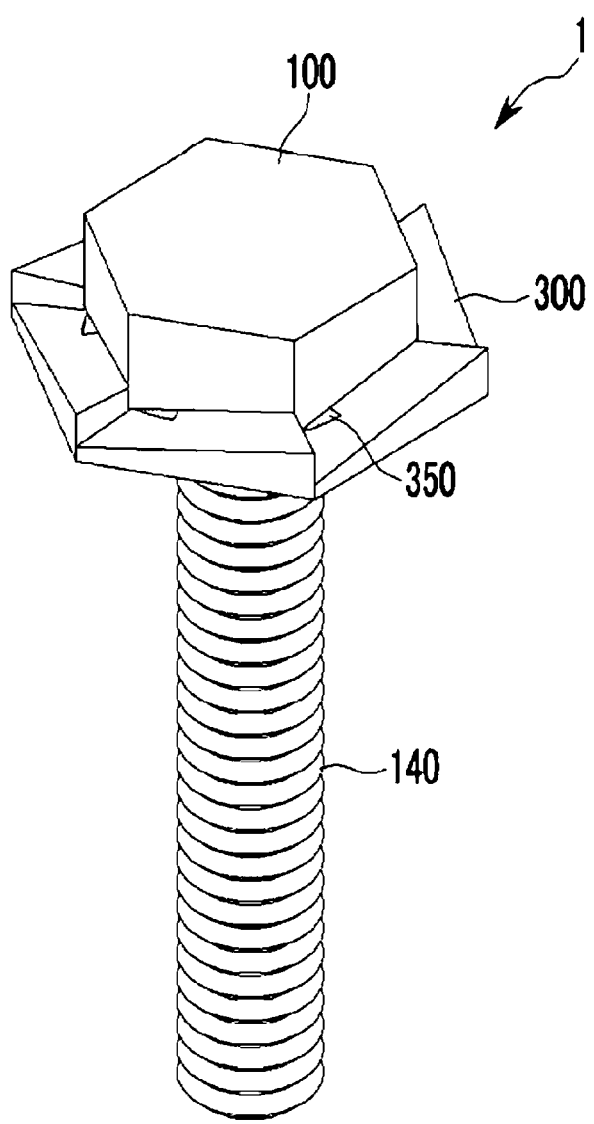
FIG. 1 is a perspective view showing the configuration of an anti-loosening bolt assembly according to a first embodiment of the present invention.

Hereinbelow, exemplary embodiments of the present invention will be described in detail with reference to the accompanying drawings. Throughout the drawings, the same reference numerals will refer to the same or like parts. It is to be understood that the present invention is not limited to the disclosed embodiments, but on the contrary, is intended to cover various modifications within the spirit and scope of the appended claims. The exemplary embodiments of the present invention are provided to fully describe the present invention to those skilled in the art. Therefore, the shapes of elements in the drawings may be exaggerated for clear description of the present invention. Detailed descriptions of known functions and configurations that unnecessarily obscure the subject matter of the present invention are omitted.

Figure 2:
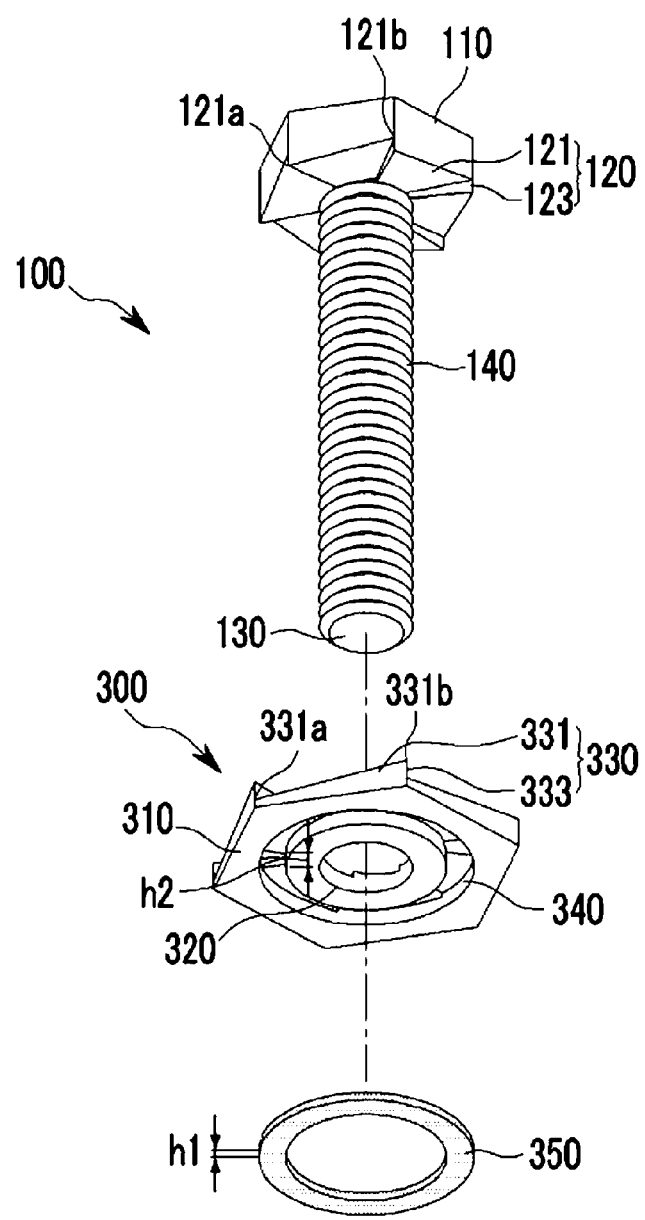
FIG. 2 is an exploded perspective view showing the configuration of the anti-loosening bolt assembly according to the first embodiment of the present invention.

FIG. 1 is a perspective view showing the configuration of an anti-loosening bolt assembly 1 according to a first embodiment of the present invention, and FIG. 2 is an exploded perspective view showing the configuration of the anti-loosening bolt assembly 1 according to the first embodiment of the present invention.

As shown in FIGS. 1 and 2, the anti-loosening bolt assembly 1 of the present invention includes: the bolt 100; a fixed nut N of FIG. 5 into which the bolt 100 is threaded; a washer 300 arranged between the bolt 100 and an objective member M of FIG. 5 to be fastened by the bolt 100, the washer 300 combined therewith so as to prevent the bolt 100 from loosening.

As shown in FIG. 5, the objective member M is arranged between the fixed nut N having threads corresponding to the threads of the bolt 100 in the anti-loosening bolt assembly 1 of the present invention and the bolt 100, and the washer 300 combined with the objective member M and the bolt 100 at a location therebetween, so that the bolt 100 is kept in stable engagement with the objective member M and the fixed nut N for a long time.

The bolt 100 includes a bolt head 110 rotated by pressing of an external force, and a bolt shank 130 extending from a lower surface of the bolt head 110. The bolt head 110 is formed in a polygonal shape having a cross-section such as a hexagon such that the bolt head 110 is tightened by a tool such as a spanner (not shown). The upper surface of the bolt head 110 is flat, and the lower surface thereof are provided with a plurality of locking protrusions 120.

Here, each of the locking protrusions 120 includes an inclined locking surface 121 and a vertical locking surface 123 formed repeatedly in a circumferential direction of the bolt head 110. Here, a lower end part 121a of the inclined locking surface 121 is directed to a tightening direction of the bolt 100, and the upper end part 121b thereof is directed to a loosening direction of the bolt 100.

The vertical locking surface 123 vertically connects a step between neighboring inclined locking surfaces 121. The vertical locking surface 123 is combined with a vertical stop surface 333 of the washer 300 while contacting with the vertical stop surface 333 of the washer 300. Accordingly, when the bolt 100 is threaded into the fixed nut N, the bolt 100 and the washer 300 rotate together.

The bolt shank 130 vertically extends from the lower surface of the bolt head 110 to a predetermined length. First threads 140 are formed on an outer circumferential surface of the bolt shank 130.

The washer 300 is inserted between the bolt 100 and the objective member M so that the engagement of the bolt 100 with the fixed nut N is maintained. Meanwhile, the fixed nut N may include second threads (not shown) corresponding to the first threads 140 on an inner circumferential surface of the fixed nut N. Further, the washer 300 is arranged to come into contact with the lower part of the bolt head 110.

Figure 3A:
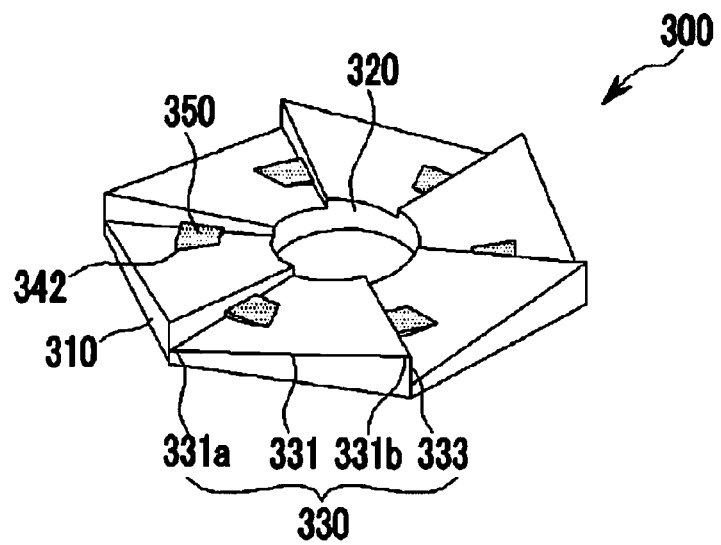
FIGS. 3a and 3b are perspective views showing the upper parts of a washer of the anti-loosening bolt assembly according to a first embodiment of the present invention before a bolt is engaged with a fixed nut.
Figure 3B:
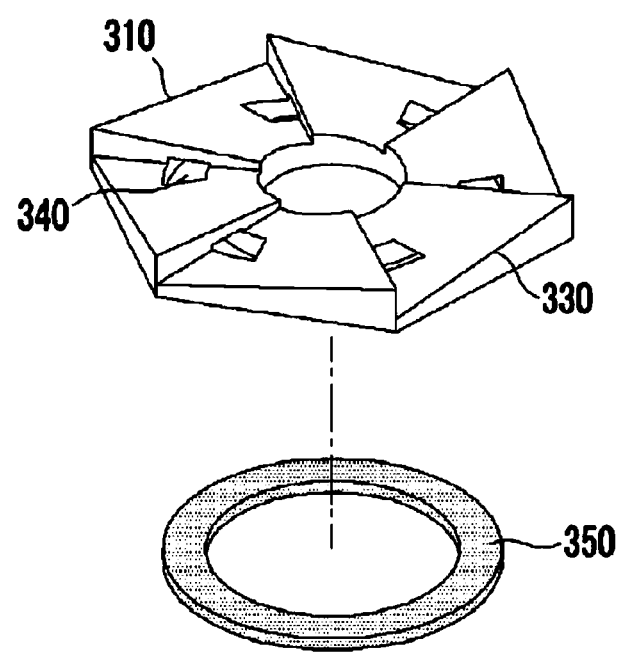

As shown in FIG. 3, the washer 300 includes: a washer body 310; a stop protrusion 330 protruding from an upper surface of the washer body 310; a shank insertion hole 320 through which the bolt shank 130 passes the washer body 310; an insert groove 340 formed through the washer body 310 in a circumferential direction of the shank insertion hole 320 of the washer body 310; and a magnetic member 350 inserted into the insert groove 340.

The stop protrusion 330 is formed by protruding slantingly upward from the upper surface of the washer body 310. The stop protrusion 330 includes the vertical stop surface 333 that vertically connects an inclined stop surface 331 and a neighboring inclined stop surface 331.

The stop protrusion 330 is formed in a shape corresponding to the locking protrusion 120 of the bolt head 110. Accordingly, when the bolt 100 is fastened to the fixed nut N, the locking protrusion 120 comes into contact with the stop protrusion 330, and thus the vertical locking surface 123 and the vertical stop surface 333 come into contact with each other, and thus the vertical locking surface 123 is combined with the vertical stop surface 333.

Here, an upper end part 331b of the inclined stop surface 331 is directed to the loosening direction of the bolt 100, and a lower end part 331a of the inclined stop surface 331 is directed to the tightening direction of the bolt 100.

The insert groove 340 receives the magnetic member 350 thereinto. The insert groove 340 is formed through the washer body 310 from the lower surface of the washer body 310 to a through hole 342 formed on the lower end part 331a of the upper surface of the washer body 310. In this case, the stop protrusion 330 slantingly protrudes from the upper surface of the washer body 310, and as shown in FIG. 3a, the through hole 342 is formed through a predetermined portion of the upper surface of the washer body 310.

When the objective member M is fastened by the bolt 100 while the magnetic member 350 is inserted into the insert groove 340, the combination of the washer 300 and the objective member M is improved by a magnetic force of the magnetic member 350. In this case, when a rotational force is applied to the bolt 100 in the loosening direction, the inclined locking surface 121 of the bolt head 110 comes into close contact with the inclined stop surface 331 of the washer 300, thereby preventing the bolt 100 from loosening and rotating in the loosening direction.

The magnetic member 350 is formed in a ring shape so as to be inserted into the insert groove 340. Here, the magnetic member 350 has a thickness h1 less than the thickness h2 of the insert groove 340, and before the washer 300 is combined with the bolt 100 by contacting with the bolt 100, the magnetic member 350 is stuck to the upper surface of the insert groove 340, and thus the magnetic member 350 is spaced from a lower surface of the washer body 310 to a predetermined length.

The reason that the magnetic member 350 has the thickness h1 less than the thickness h2 of the insert groove 340 is that before the washer 300 is combined with the bolt 100, the bolt 100 and the washer 300 are magnetized by being mixed together, so they tend to stick to each other.

In this case, when a plurality of washers 300 are magnetized by being mixed together while the magnetic member 350 has the same thickness as the thickness of the insert groove 340, and the magnetic member 350 is exposed to the lower part of the washer body 310, it is difficult to separate the washers 300 stuck together by the magnetic force.

Figure 4A:
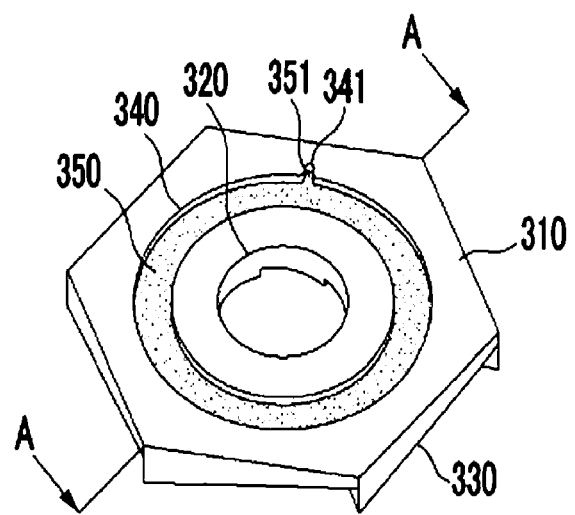
FIGS. 4a to 4c are views showing the lower part and the cross-section of the washer of the anti-loosening bolt assembly according to the first embodiment of the present invention before the bolt is engaged with the fixed nut.
Figure 4B:
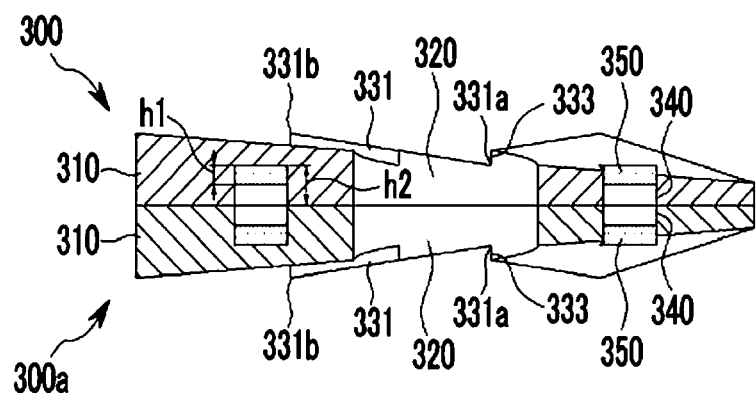

Accordingly, in the washer 300 of the present invention, the magnetic member 350 has a thickness h1 less than the thickness h2 of the insert groove 340 such that the magnetic member 350 is spaced apart from the lower surface of the washer body 310 to a predetermined height. Accordingly, as shown in FIG. 4b, though a plurality of washers 300 and 300a come into contact with each other, it is efficient to separate the washer 300 and the neighboring washer 300a since the magnetic member 350 is stuck on the upper surface of the insert groove 340.

In this case, as shown in FIG. 3a, since the magnetic member 350 is located on the upper surface of the insert groove 340, the magnetic member 350 is exposed to a predetermined height outside the upper end of the through hole 342. In this case, when the objective member M is fastened by rotating the bolt head 110 of the bolt 100 relative to the washer 300 such that the objective member M is fastened by the bolt 100, the locking protrusion 120 of the bolt 100 comes into close contact with the stop protrusion 330, and thus the vertical locking surface 123 of the locking protrusion 120 presses the magnetic member 350 exposed outside the upper end of the through hole 342.

According to the first embodiment of the present invention having an above-mentioned configuration, a process of fastening the objective member M by using the anti-loosening bolt assembly 1 will be described referring to FIGS. 1 to 6.

Before the objective member M is fastened by the bolt 100 of the anti-loosening bolt assembly 1, the bolt 100 and the washer 300 are stored together or separately. In this case, the washer 300 sticks to a neighboring washer 300 due to the magnetic force of the magnetic member 350 inserted into the washer 300.

As shown in FIG. 4b, the plurality of washers 300 and 300a keep sticking to upper surfaces of the insert grooves 340 due to magnetic forces of the magnetic members 350. In this case, each of the magnetic members 350 of the washers 300, 300a is exposed to a predetermined height outside the upper end of each of the through holes 342 formed on the upper surfaces of the washers 300 and 300a.

Since the magnetic member 350 is located on the upper surface of the insert groove 340, the magnetic member 350 is spaced apart from the lower surface of the washer body 310 at a predetermined interval. Accordingly, though the neighboring washers 300 and 300a come into contact with each other, the magnetic member 350 of the washer 300 is spaced apart from the neighboring washer 300a as much as the interval mentioned above, thus the magnetic force of the magnetic member 350 of the washer 300 is insufficient, so that the magnetic member 350 of the washer 300 cannot come into contact with the washer 300a.

Accordingly, when the washer 300 is separated from the neighboring washer 300a so as to use the washer 300, it requires much less power to separate the washer 300 from the washer 300a than when the magnetic member 350 of the washer 300a comes into contact with the washer 300.

After the washer 300 is separated from the neighboring washer 300a, the washer 300 is arranged on an upper surface of the objective member M, and the bolt shank 130 is inserted into the shank insertion hole 320. Then, when rotating the bolt head 110 by using a spanner (not shown), the bolt 100 is fastened to the fixed nut N, and thus the objective member M is fastened between the bolt 100 and the fixed nut N.

Figure 5A:
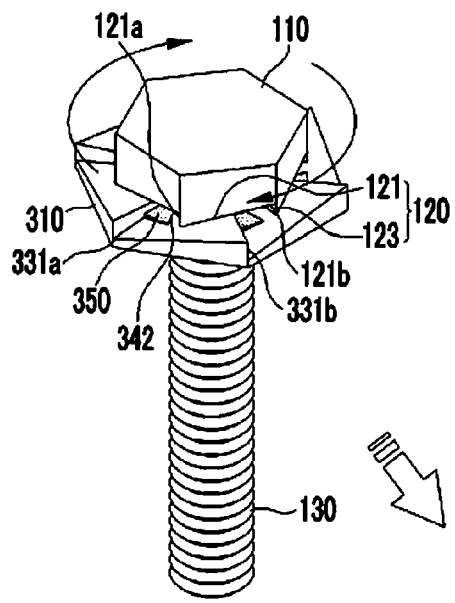
FIGS. 5a and 5b are perspective views showing a process in which an objective member is fastened by using the anti-loosening bolt assembly according to the first embodiment of the present invention.

As shown in FIG. 5a, the locking protrusion 120 of the bolt head 110 is initially introduced to the inclined stop surface 331 of the stop protrusion 330 of the washer 300, and then comes into contact with the stop protrusion 330, and thus the locking protrusion 120 and the washer 300 rotate together.

Thereafter, while the magnetic member 350 exposed outside an upper end of the through hole 342 is lowered to the lower surface of the washer body 310 by pressing of the lower end part 121a, the bolt head 110 stops rotating, and the engagement of the bolt 100 and the fixed nut N is completed.

Figure 5B:
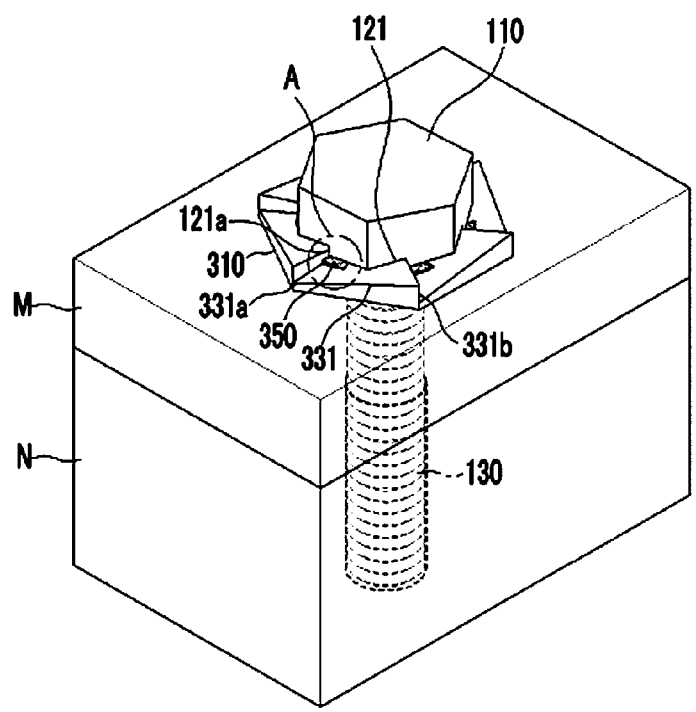

That is, as shown in FIG. 5b, when the engagement of the bolt 100 and the fixed nut N is completed, the vertical locking surface 123 of the locking protrusion 120 and the vertical stop surface 333 of the stop protrusion 330 come into close contact with each other, and the magnetic member 350 and the lower surface of the washer body 310 come into close contact with the upper surface of the objective member M such a steel frame, and thus the bolt head 110 is no longer rotated.

Figure 6:
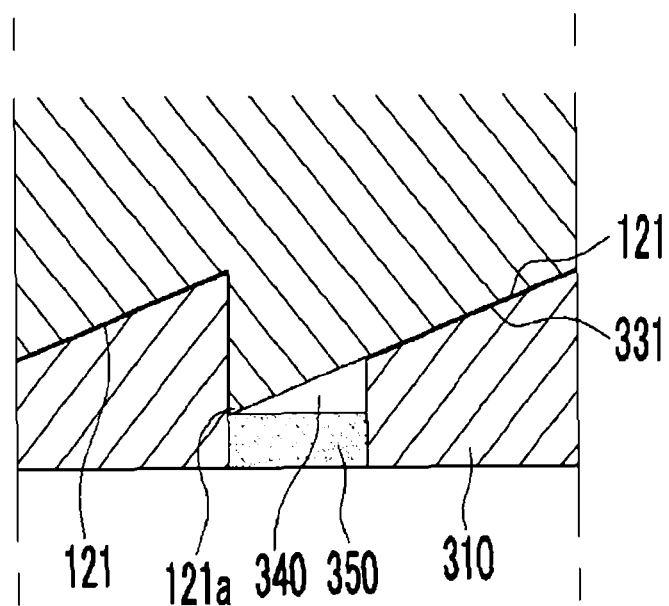
FIG. 6 is a view showing the cross-section of the washer of the anti-loosening bolt assembly after the bolt is engaged with the fixed nut according to the first embodiment of the present invention.

Meanwhile, FIG. 6 is an enlarged cross-section of the portion A of FIG. 5b. As shown in FIGS. 5b and 6, the lower end part 121a of the locking protrusion 120 moves down to the lower end part 331a of the stop protrusion 330. In other words, the lower end part 121a of the locking protrusion 120 presses the upper part of the magnetic member 350 exposed outside an upper end of the through hole 342, and thus the magnetic member 350 is lowered to the lower surface of the washer body 310.

That is, the upper part of the magnetic member 350 exposed outside an upper end of the through hole 342 is lowered toward the lower part of the insert groove 340 by pressing of the lower end part 121a of the locking protrusion 120, and as shown in FIG. 6, the magnetic member 350 is lowered to the lower surface of the washer body 310. In this case, the magnetic member 350 applies the magnetic force to the objective member M from the lower part of the insert groove 340 such that the engagement of the bolt 100 and the objective member M is kept stable.

In addition, though a vibration applied to the objective member M is transmitted to the washer 300 and the bolt 100, the washer 300 having the magnetic member 350 is in close contact with the objective member M, and the lower end part 121a of the bolt head 110 is in close contact with the inclined stop surface 331 of the washer 300, thereby preventing the bolt 100 from loosening and rotating.

Figure 4C:
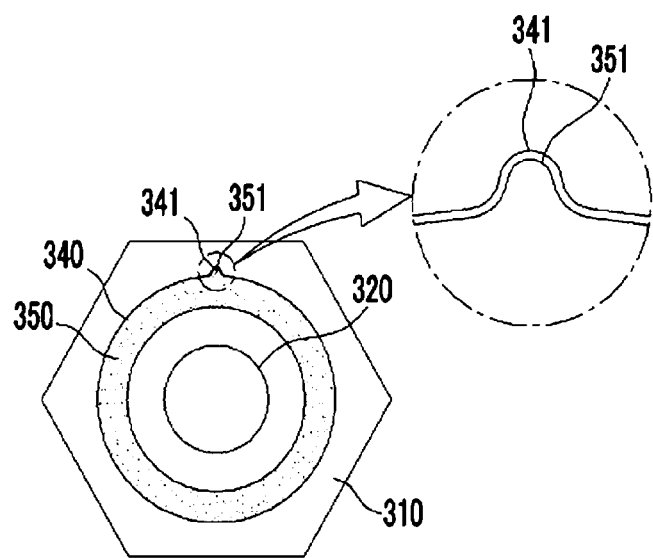

Furthermore, as shown in FIG. 4c, a protrusion 351 is provided on the magnetic member 350, and a protrusion insert groove 341 is formed on an outer circumferential surface of the insert groove 340 of the washer 300 in a radial direction such that the protrusion 351 corresponds to the protrusion insert groove 341. Accordingly, when the magnetic member 350 comes into close contact with the objective member M while the magnetic force is applied to the objective member M, the washer 300 is combined with the objective member M by the magnetic member 350, thereby preventing the washer 300 from idle-rotating relative to the objective member M. That is, the washer 300 is prevented from rotating relative to the objective member M.

As mentioned above, according to the first embodiment of the present invention, the bolt 100 of the anti-loosening bolt assembly 1 is prevented from rotating by the combination of the inclined locking surface 121 and the inclined stop surface 331 formed on the lower surface of the bolt head 110 and on the upper surface of the washer 300 respectively, and the magnetic member 350 provided in the washer 300 maintains a combined state of the washer 300 with the objective member M, thereby preventing the washer 300 from rotating, and preventing the bolt 100 from loosening.

In addition, according to the first embodiment of the present invention, before the bolt 100 of the anti-loosening bolt assembly 1 is engaged with the objective member M, the magnetic member 350 of the washer 300 is spaced apart from the lower surface of the washer 300, and when the bolt 100 is fastened to the fixed nut N, the vertical locking surface 123 of the bolt 100 lowers the magnetic member 350, and thus the magnetic member 350 comes into close contact with the objective member M, which can improve the engagement of the bolt 100 and the washer 300, and can improve the engagement of the washer 300 and the objective member M each other.

Accordingly, before the washer 300 into which the magnetic member 350 is inserted is combined with the objective member M, the magnetic member 350 is not exposed to the lower part of the washer body 310, but is located in the upper part of the washer body 310, and thus the washer 300 can be easily separated from neighboring bolts and washers.

Figure 7:
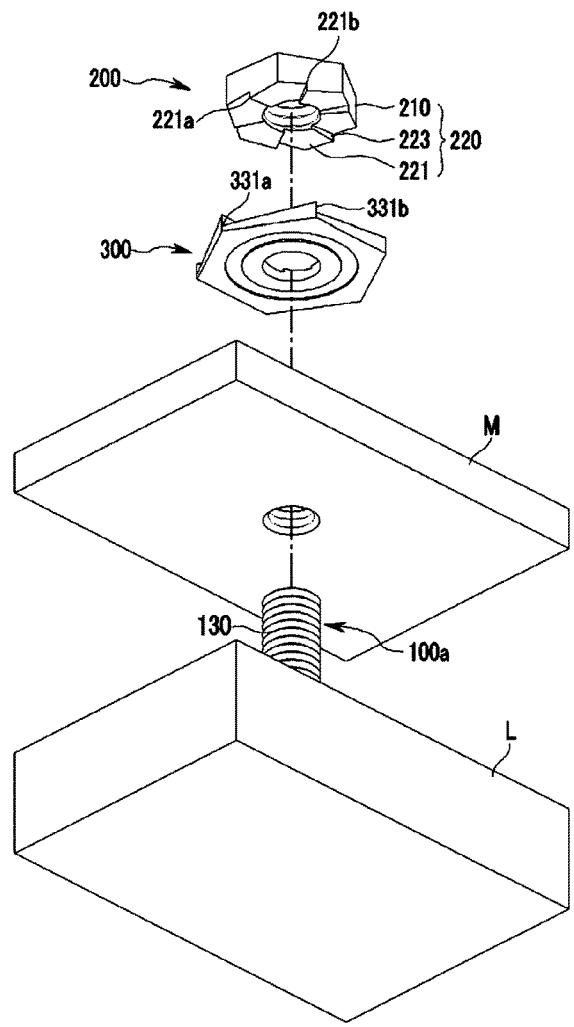
FIG. 7 is a perspective view showing a process in which an objective member is fastened by using an anti-loosening bolt assembly according to a second embodiment of the present invention.

Meanwhile, FIG. 7 is a perspective view showing a process in which an objective member M is fastened by using an anti-loosening bolt assembly 1a according to a second embodiment of the present invention.

According to the first embodiment of the present invention described above, in the anti-loosening bolt assembly 1, the lower surface of the bolt head 110 and the upper surface of the washer 300 come into contact with each other, thereby preventing the bolt 100 from loosening.

On the other hand, according to the second embodiment of the present invention, in the anti-loosening bolt assembly 1a, a lower surface of a nut 200 and an upper surface of the washer 300 come into contact with each other, thereby preventing the nut 200 from loosening.

That is, when the locking protrusion 120 of the bolt head 110 in the first embodiment of the present invention mentioned above is applied by being replaced with a locking protrusion 220 of the nut 200 in the second embodiment of the present invention, the locking protrusion 220 comes into close contact with the washer 300.

When compared to the anti-loosening bolt assembly 1 according to the first embodiment of the present invention, the anti-loosening bolt assembly 1a according to the second embodiment of the present invention is engaged in the order of the nut 200, the washer 300, the objective member M, and a fixed bolt 100a where the engaging forces between the elements mentioned above are applied from the fixed bolt 100a to the nut 200. Accordingly, though a rotational force is applied to the nut 200 as well as to the fixed bolt 100a, the fixed bolt 100a can be prevented from loosening.

Here, the fixed bolt 100a is provided by being integral to a cement structure L.

Here, the lower surface of the nut 200 of FIG. 7 is the same as the lower surface of the bolt 100 of FIG. 2 in configuration, and the washer 300 of FIG. 7 is the same as the washer 300 of FIG. 2 in configuration.

According to the second embodiment of the present invention, as shown in FIG. 7, the fixed bolt 100a is arranged in the lowest part of the anti-loosening bolt assembly 1a, the objective member M is threaded into the bolt shank 130 of the fixed bolt 100a. Further, the washer 300 and the nut 200 are engaged with the bolt shank 130 exposed outside an upper end of the objective member M while passing through the objective member M.

While the washer 300 is fitted over the bolt shank 130, the nut 200 rotates. While the magnetic member 350 exposed outside an upper end of the through hole 342 is lowered to the lower surface of the washer body 310 by pressing of the lower end part 221a generated due to a rotation of the nut 200, the nut 200 stops rotating, and the engagement of the nut 200 and the fixed bolt 100a is completed.

When the engagement of the nut 200 and the fixed bolt 100a is completed, a vertical locking surface 223 of the locking protrusion 220 and the vertical stop surface 333 of the stop protrusion 330 come into close contact with each other, and the magnetic member 350 and the lower surface of the washer body 310 come into close contact with the upper surface of the objective member M such as a steel frame, and thus the nut 200 is no longer rotated.

Although preferred embodiments of the present invention have been described for illustrative purposes, those skilled in the art will appreciate that various modifications, additions and substitutions are possible, without departing from the scope and spirit of the invention as disclosed in the accompanying claims. Therefore, it will be understood that the present invention is not limited only to the form mentioned in the detailed description. Accordingly, the true technical protection scope of the present invention will be defined by the technical spirit of the appended claims. In addition, it should be appreciated that the present invention is intended to include all modifications and equivalents and alternatives falling within the spirit and scope of the invention as defined by the appended claims.

What is claimed is:

1. An anti-loosening bolt assembly comprising:
   a bolt having a bolt head and a bolt shank, wherein the bolt shank vertically extends from the bolt head, the bolt shank having first threads formed on an outer circumferential surface thereof;
   a fixed nut having second threads on an inner circumferential surface thereof, the second threads being engaged with the first threads of the bolt; and
   a washer arranged between the bolt and an objective member to be fastened by the bolt,
   wherein the bolt head includes a plurality of locking protrusions provided on the lower surface thereof in a circumferential direction of the bolt head, each of the locking protrusions having an inclined locking surface and a vertical locking surface, wherein the inclined locking surface is provided by having an inclination on the lower surface of the bolt head, and the vertical locking surface connects the inclined locking surface with a neighboring inclined locking surface, and an upper end part of the inclined locking surface is directed to a loosening direction of the bolt, and a lower end part of the inclined locking surface is directed to a tightening direction of the bolt,
   the washer includes a plurality of stop protrusions provided on an upper surface thereof in a circumferential direction of the washer, each of the stop protrusions having an inclined stop surface and a vertical stop surface, wherein the inclined stop surface is provided by having an inclination on the upper surface of the washer, and the vertical stop surface connects the inclined stop surface with a neighboring inclined stop surface, and an upper end part of the inclined stop surface is directed to a loosening direction of the bolt, and a lower end part of the inclined stop surface is directed to a tightening direction of the bolt, and
   a magnetic member is provided in the washer such that the magnetic member maintains a combined state of the washer with the objective member using a magnetic force, so that when a rotational force is applied to the bolt in the loosening direction, the inclined locking surface of the bolt is stopped by the inclined stop surface of the washer, thereby preventing the bolt from loosening and rotating.

2. The anti-loosening bolt assembly of claim 1, wherein the washer includes a ring-shaped insert groove on a lower surface thereof, and a through hole on an upper surface thereof, and
   the magnetic member has a thickness less than a thickness of the insert groove.

3. The anti-loosening bolt assembly of claim 2, wherein when the bolt is fastened to the fixed nut, a lower end part of the locking protrusion presses the magnetic member exposed outside an upper end of the through hole such that the magnetic member is located in a lower part of the insert groove.

4. The anti-loosening bolt assembly of claim 2, wherein the magnetic member includes a protrusion protruding outward from an outer circumferential surface thereof in a radial direction, and the insert groove includes a protrusion insert groove such that the magnetic member is held in the washer by an insertion of the protrusion into the protrusion insert groove.

5. An anti-loosening bolt assembly comprising:

a fixed bolt having a fixed bolt shank, the fixed bolt shank having first threads formed on an outer circumferential surface thereof;

a nut having second threads on an inner circumferential surface thereof, the second threads of the nut being engaged with the first threads of the fixed bolt shank; and a washer arranged between the nut and an objective member to be fastened by the nut, wherein the nut includes a plurality of locking protrusions provided in a circumferential direction thereof, each of the locking protrusions having an inclined locking surface and a vertical locking surface, wherein the inclined locking surface is provided by having an inclination on the lower surface of the nut, and the vertical locking surface connects the inclined locking surface with a neighboring inclined locking surface, and an upper end part of the inclined locking surface is directed to a loosening direction of the nut, and a lower end part of the inclined locking surface is directed to a tightening direction of the nut, the washer includes a plurality of stop protrusions provided on an upper surface thereof in a circumferential direction of the washer, each of the stop protrusions having an inclined stop surface and a vertical stop surface, wherein the inclined stop surface is provided by having an inclination on the upper surface of the washer, and the vertical stop surface connects the inclined stop surface with a neighboring inclined stop surface, and an upper end part of the inclined stop surface is directed to a loosening direction of the nut, and a lower end part of the inclined stop surface is directed to a tightening direction of the nut, and a magnetic member is provided in the washer such that the magnetic member maintains a combined state of the washer with the objective member using a magnetic force, so that when a rotational force is applied to the nut in the loosening direction, the inclined locking surface of the nut is stopped by the inclined stop surface of the washer, thereby preventing the nut from loosening and rotating.

6. The anti-loosening bolt assembly of claim 5, wherein the washer includes a ring-shaped insert groove on a lower surface thereof, and includes a through hole on an upper surface thereof, and the magnetic member has a thickness less than a thickness of the insert groove.

7. The anti-loosening bolt assembly of claim 6, wherein when the nut is engaged with the fixed bolt, a lower end part of the locking protrusion presses the magnetic member exposed outside an upper end of the through hole such that the magnetic member is located in a lower part of the insert groove.

8. The anti-loosening bolt assembly of claim 7, wherein the magnetic member includes a protrusion protruding outward from an outer circumferential surface thereof in a radial direction, and the insert groove includes a protrusion insert groove such that the magnetic member is held in the washer by an insertion of the protrusion into the protrusion insert groove.

\* \* \* \* \*